United States Patent [19]

Frankewich

[11] 3,749,121
[45] July 31, 1973

[54] RELIEF VALVE APPARATUS

[76] Inventor: Peter A. Frankewich, R.R. 2, Box 372, Daytona Beach, Fla. 32019

[22] Filed: May 11, 1971

[21] Appl. No.: 142,312

[52] U.S. Cl. ............................................. 137/512.2
[51] Int. Cl. ............................................. F16k 17/00
[58] Field of Search ...................... 137/512.2, 512.3

[56] References Cited
UNITED STATES PATENTS

| | | | |
|---|---|---|---|
| 1,115,582 | 11/1914 | Sauer | 137/512.2 X |
| 3,419,113 | 12/1968 | Shelley | 137/512.2 X |
| 807,269 | 12/1905 | Hildebrand | 137/512.2 X |
| 971,689 | 10/1910 | Schebler | 137/512.2 X |
| 2,653,626 | 9/1953 | Finlayson | 137/512.2 X |
| 2,704,035 | 3/1955 | Bader | 137/512.2 X |

*Primary Examiner*—Martin P. Schwadron
*Attorney*—Duckworth & Hobby

[57] ABSTRACT

A tamper proof safety relief valve having both a basic relief valve and a safety relief valve capability incorporated therein. The relief valve is adapted to open a valve port when a predetermined pressure is applied thereagainst and a tamper proof safety relief element is adapted to open a valve port through said relief valve when a predetermined pressure is reached. If the basic relief valve fails to operate, the safety relief element will come into operation at a pressure just beyond the operating pressure of the basic relief valve.

1 Claim, 3 Drawing Figures

Patented July 31, 1973 3,749,121

INVENTOR.
PETER A. FRANKEWICH
BY
Duckworth & Hobby
ATTORNEYS.

RELIEF VALVE APPARATUS

BACKGROUND OF THE INVENTION

The present invention relates to relief valves and especially to relief valves adapted for use with pressure type systems such as boiler configurations, hydraulic devices, and chemical processing and pneumatic systems to relieve pressures exceeding the operating capability of the equipment.

In the past many types of relief valves have been provided for use in boilers, and similar systems and to provide relief in the event pressure exceeds predetermined levels to prevent such equipment from exceeding the pressure limits within which it was designed to operate and thereby creating a dangerous situation by the high pressure.

These safety valves for letting out excess pressure typically have spring or lever operated lids fitting tightly in a seat of the same shape. The valves open when pressure reaches a danger limit, and frequently may be adjusted to operate at desired pressure levels by changing the spring or the weight of a lever. The relief valve is a special form of safety valve and usually has a heavy spring biasing a disc, gate, plug or lid against a valve seat to block a passageway through the valve from an inlet port to an outlet port through the valve port. The spring may be adjusted by a spring cap so that when the pressure in an apparatus reaches a predetermined or dangerous level, it will push the valve disc against the spring to unseat the disc to allow the escape of a fluid through the valve port and out the outlet. These vlaves have been satisfactory in operation but mechanical damage to the valve or damage caused by an environmental condition, or even by tampering with the valve, can result in failure of the basic relief valve which may result in failure of the pressure equipment producing unsafe conditions for operating personnel. In high pressure operations, safety codes generally provide that such equipment have at least two valves, each directed towards operation within a few psi of each other.

To overcome this problem, it is accordingly one object of the present invention to provide a basic relief valve having a tamper proof safety relief element providing the advantages of a pair of safety relief valves but in which the safety elements are tamper proof, and which unit is provided in a single valve casing.

SUMMARY OF THE INVENTION

The present invention relates to safety valves and especially to safety relief valves adapted to open upon predetermined pressure levels being reached in an apparatus to which the valve is connected and has a casing adapted for connection to an apparatus operating under pressure. The casing has a first gate means located therein for blocking the passageway through the valve, which gate is maintained in a valve seat by a predetermined pressure applied to one side thereof. A second gate means located inside the valve casing is maintained in a valve seat located in the first valve gate and blocks a pressure port through the first valve gate. Both valve ports open passageways through the valve and out the valve outlet whereby pressure applied to a pressure port will normally open the first valve port upon the pressure reaching a predetermined level, but if the first port fails to open, a slight rise over the predetermined pressure level for the first gate will operate the second valve gate to open the second valve port through the first valve gate to relieve the pressure being applied to the valve. The valve provides for adjusting the operating pressure of the basic relief valve as well as the tamper proof safety relief valve portion.

Brief Description of the Drawings

Other objects, features and advantages of this invention will be apparent from a study of the written description and the drawings in which.

Description of the Preferred Embodiment

Figure 1:
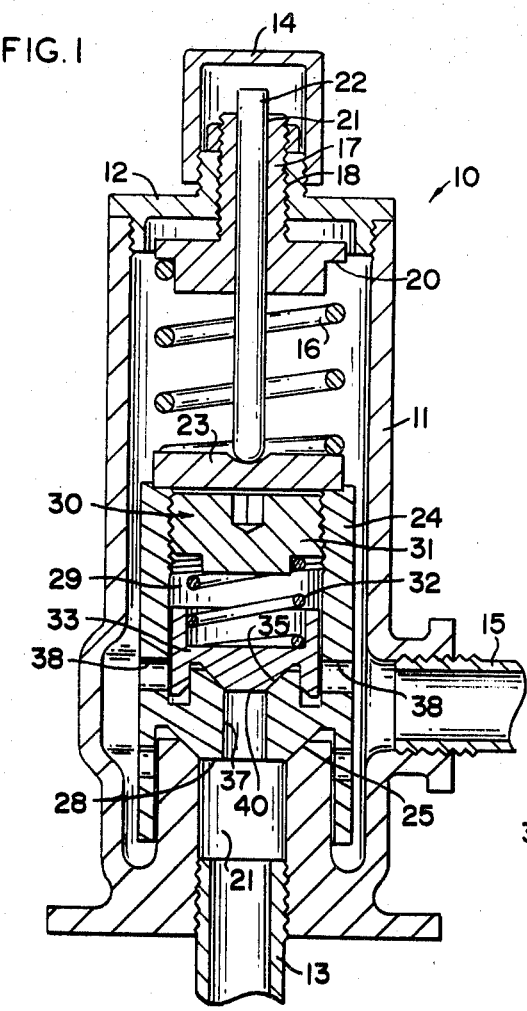
FIG. 1 shows a cutaway sectional view of one embodiment of the present invention in a closed position.
Figure 2:
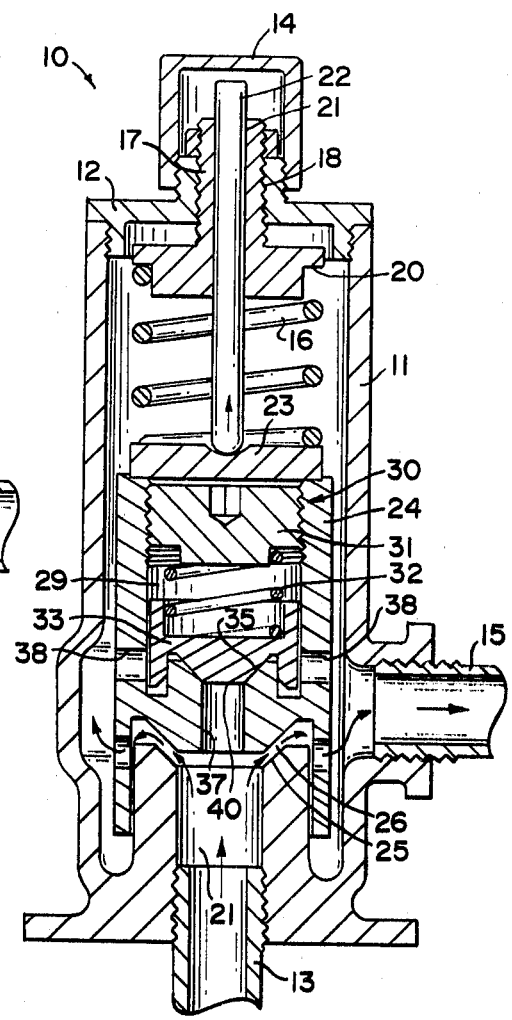
FIG. 2 is a sectional view of the embodiment of FIG. 1 with the basic relief valve in an open position.
Figure 3:
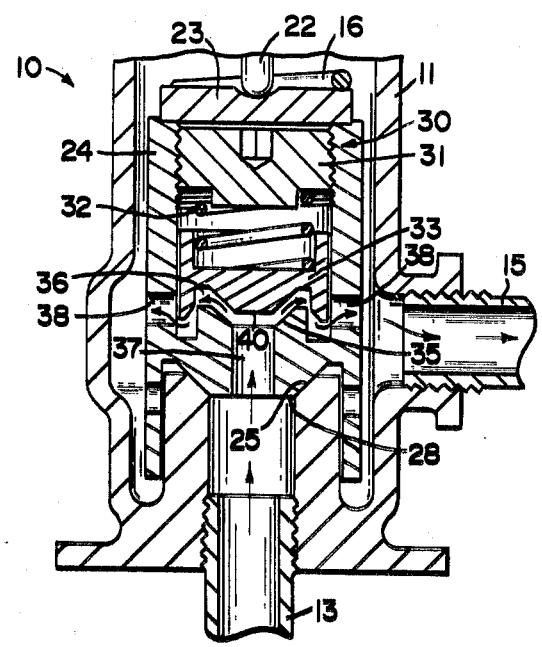
FIG. 3 is a sectional view of the embodiment of FIGS. 1 and 2 with the tamper proof safety relief valve section in an open position.

Referring now to FIGS. 1, 2 and 3 of the drawings, a safety relief valve 10 can be seen having a casing 11 with a threaded top portion 12 at one end and a pressure port 13 at the other end thereof. A cap member 14 is threaded onto the top portion 12 and an outlet port 15 is connected to the casing 11. The valve 10 is closed in its normal operating position and is set to operate upon the pressure in the pressure port 13 reaching a predetermined level for which the valve has been set, thereby opening the pressure port to relieve the pressure, allowing the fluid which may be a gas or liquid, under pressure to escape through the outlet port 15 until the pressure again drops below the predetermined level at which point the valve will close itself. The operation of the valve provides a coil spring 16 located inside the casing 11 and held at one end of a spring cap or adjustment member 17 which has a threaded portion 18 provided into the threaded top 12 of the casing 11. The spring cap 17 has a bottom portion 20 which engages the spring 16 at one end thereof. Passageway 21 passes through the spring cap 17 and has a rod 22 passing therethrough and adapted to slide therein. Spring 16 is biased against spring holding member 23 located at the other end of the spring from the spring holding cap 17 which cap 23 also has rod 22 pushed thereagainst. Spring holding member 23 is pressed against gate assembly 24 which gate is sometimes referred to as the disc, gate, plug or lid, depending upon the shape of the assembly, but the gate assembly 24 fits into a valve seat 25 for sealing a valve port 26 which blocks the passageway from 27, which passes from the pressure port 13 through the valve port 26 and out the outlet 15 when the valve is in an open position, as can be seen in FIG. 2. When a predetermined pressure is applied against the gate assembly 24, the bottom portion 28, the pressure will overcome the spring 16 pushing the whole valve assembly 24 into an open position and allowing the fluid under pressure tpass through the valve port 26 and out the outlet 15 as shown by the arrows in FIG. 2. The valve gating assembly 24 has a tamper proof safety relief valve assembly 30 located therein including a threaded top adjustment 31 for the assembly 24, which threaded top 31 is the cap for a spring 32 which spring 32 biases against a second valve gate 33, which valve slides within the open portion 34 of the valve assembly 24 and closes against a valve seat 35 to block a valve port 36 preventing the fluid under pressure from passing from a pressure port 37 through the valve port 36 through apertures 38 in the walls of the valve assembly 24 and out the outlet 15, forming a second passageway through valve 10. In operation, as can more clearly be seen in FIG. 3, if the basic valve fails to operate the pressure in the pressure port 13 and also in the pressure port 37 will apply pressure against the bottom 40 of the gate 33, and the tamper proof safety relief valve 30 will force the gate 33 against the spring 32, lifting the gate 33 upon a predetermined pressure being reached, opening the valve port 36, as shown by the arrows to allow the fluid under pressure to escape through the openings 38 and out the outlet 15. In a typical operation, the basic relief valve may be set to operate at 100-psi and the tamper proof safety relief valve may be set to operate at 110-psi in a system in which the perssure should not exceed 125-psi. If the pressure reaches 110-psi without having opened the basic relief valve 10, the auxiliary or tamper proof safety relief valve 30 will be opened to prevent the pressure from reaching the 125-psi level. The basic relief components of the valve can be adjusted by removing the seal cap 14, loosening a lock nut 19 and adjusting the threaded top portion 17 to further compress the spring 16. However, the tamper proof or safety valve element 30 cannot be adjusted without a major disassembly of the valve, and whereby the valve has backup protection to assure the safety in the function of the valve system components.

It should be clear at this point that an inexpensive tamper proof safety relief valve has been provided which has an added tamper proof safety valve capability which is especially useful for installation in inaccessible areas where a high degree of reliability is required. One embodiment has been disclosed, but it should be clear that other embodiments are contemplated as being within the spirit and scope of the present invention and that the valve can be made of any material such as stainless steel or other non-corrosive metals, as well as ferrous or non-ferrous metals, plastics, synthetics, or any combination of these materials, and can be adapted to any particular users' specific application.

Accordingly, the present invention is not to be construed as limited to the particular forms disclosed herein, since these are to be regarded as illustrative rather than restrictive.

I claim:
1. A relief valve apparatus comprising:
   a. a casing having an inlet and an outlet with a passageway therebetween;
   b. a first valve gate positioned in said passageway, said first valve gate having a removable spring holding member;
   c. a first coil spring biasing said first valve gate, one end of said spring engaging said removable spring holding member whereby said first valve gate is adapted to open upon a first predetermined pressure being applied through said inlet against said first valve gate;
   d. an adjustment member engaging said spring and threaded through an opening in said casing so as to facilitate adjustments to the compression of said first coil spring and thereby select said first predetermined pressure;
   e. a second valve gate positioned within said first valve gate;
   f. a second coil spring positioned within said first valve gate for biasing said second valve gate, whereby said second valve gate is adapted to open an alternate passageway between said inlet and said outlet and through said first valve gate upon a second predetermined pressure greater than said first predetermined pressure being applied through said inlet and against said second valve gate;
   g. a second valve gate adjustment cap disposed within said first valve gate and underneath said removable spring holding member, with one end of said second coil spring biased against said adjustment cap so as to facilitate adjustment to the compression of said second coil spring and thereby select said second predetermined pressure; and wherein
   h. said casing and said first valve gate are closed such that access to such second valve gate adjustment cap is had only by removal of said engaging member, said first coil spring and said removable spring holding member.

* * * * *